(12) United States Patent
Samuelson et al.

(10) Patent No.: US 7,900,689 B2
(45) Date of Patent: Mar. 8, 2011

(54) BEND RELIEF SPACER

(75) Inventors: David E. Samuelson, Wheatfield, NY (US); Donald Robert Pautler, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 1049 days.

(21) Appl. No.: 11/710,191

(22) Filed: Feb. 23, 2007

(65) Prior Publication Data

US 2008/0202733 A1   Aug. 28, 2008

(51) Int. Cl.
*F28F 9/00*   (2006.01)
*F28D 7/06*   (2006.01)

(52) U.S. Cl. .......................... 165/68; 165/176
(58) Field of Classification Search .................. 165/153, 165/67, 68, 175, 176, 177, 143
See application file for complete search history.

(56) References Cited

U.S. PATENT DOCUMENTS

| 3,781,960 A | 1/1974 | Hoek |
| 5,826,649 A * | 10/1998 | Chapp et al. ................. 165/174 |
| 2001/0004935 A1 * | 6/2001 | Sanada et al. ................. 165/110 |
| 2007/0204977 A1 * | 9/2007 | Beamer et al. ................. 165/124 |
| 2007/0227695 A1 * | 10/2007 | Beamer et al. ................. 165/76 |

FOREIGN PATENT DOCUMENTS

| EP | 1 840 493 | | 10/2007 |
| FR | 2860289 A1 | * | 4/2005 |
| JP | 03059392 A | * | 3/1991 |
| JP | 04344033 A | * | 11/1992 |
| JP | 07012481 A | * | 1/1995 |
| JP | 2000154992 A | * | 6/2000 |
| JP | 2002243381 A | * | 8/2002 |
| JP | 2004 218852 | | 8/2004 |
| JP | 2005 909806 | | 4/2005 |
| JP | 2006078038 A | * | 3/2006 |

OTHER PUBLICATIONS

European Search Report dated Jun. 17, 2008.

* cited by examiner

*Primary Examiner* — Thu v Duong
(74) *Attorney, Agent, or Firm* — Patrick M. Griffin

(57) ABSTRACT

An core unit for a heat exchanger being bent about an axis perpendicular to the core unit's headers. Tubes establish fluid communication between the core unit's headers, and a bend relief spacer is disposed between first and second groups of tubes. During the bending process, the bend relief spacer facilitates the bend and ultimately maintains the performance of the core unit.

4 Claims, 3 Drawing Sheets

BEND RELIEF SPACER

BACKGROUND OF THE INVENTION

1. Field of the Invention

The subject invention relates to a core unit for a heat exchanger, and more specifically to a core unit having headers being spaced from one another with the centerlines thereof being parallel and extending through parallel bends.

2. Description of the Prior Art

Such core units generally include a pair of headers spaced from one another. A plurality of tubes is disposed between the headers to provide fluid communication between the headers. A plurality of fins is disposed between adjacent pairs of tubes for dissipating heat from the fluid in the tubes. The fins are generally formed from sheet metal into the shape of an accordion. The fins may be referred to as air fins, corrugated fins, or air centers. The fins may also be louvered, i.e., the fins have louvers defined therein to increase the heat transfer.

Variations of these core units are known to include bends for fitting into smaller, more compact space constraints, i.e., the headers have been bent about an axis spaced from and parallel to the tubes. However, the fins on the inner radius of the bend are frequently crushed during the bending process, resulting in decreased heat dissipation from these fins. The crushing of fins may also create stresses and/or damage or crimp the tubes, thereby decreasing the fluid flow between the headers of the core unit.

The U.S. application Ser. No. 11/392,212 filed on Mar. 3, 2006 discloses a core unit having headers bent about an axis spaced from and parallel to the tubes and presents one solution to these problems. This invention presents an alternative solution.

SUMMARY OF THE INVENTION AND ADVANTAGES

The subject invention relates to such a core unit having headers spaced from one another with the centerlines thereof being parallel and extending through parallel bends. The invention is distinguished by a bend relief spacer disposed between two groups of tubes at the location of the bend and includes a first leg engaging an end tube of a first group, a second leg engaging an end tube of a second group, and at least one cross member interconnecting the legs.

The invention also includes a method of fabricating such a core unit wherein the legs of the bend relief spacer move angularly with respect to one another to prevent stresses from bending or crimping the end tubes or crushing the air fins during the process of bending the headers. The bend relief spacer facilitates the bend and ultimately maintains the performance of the core unit.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate corresponding parts throughout the several views, a heat exchanger assembly generally shown includes an upper header that extends along an upper centerline and a lower header that extends along a lower centerline. The upper and lower headers are spaced from one another with the centerlines thereof being parallel and extending through parallel bends. The upper and lower headers are preferably of aluminum but any suitable material may be employed.

The upper header defines a plurality of upper tube slots being spaced along the upper centerline, and the lower header defines a plurality of lower tube slots being spaced along the lower centerline. The upper and lower tube slots are aligned with respect to one another, and a plurality of tubes extend between the aligned upper and lower tube slots. The tubes have a cross section defined by spaced flat sides and round ends. Each of the tubes defines a plurality of fluid passages being generally round in cross section for establishing fluid communication between the upper header and the lower header. The tubes are preferably of aluminum but any suitable material may be employed.

The flat sides of adjacent tubes are spaced from one another to define a plurality of air passages for the flow of air between the adjacent tubes. The tubes are disposed in a plurality of groups with the tubes in each group having flat sides disposed in parallel relationship with one another. A corrugated air fin is brazed between the parallel flat surfaces of the adjacent tubes in each group. The air fin extends between the lower and upper headers and preferably has louvers to increase the heat transfer from the fluid to the flow of air.

A first group of tubes is disposed along the centerlines on one side of the parallel bends, and a second group of tubes is disposed along the centerlines on the other side of the parallel bends. The flat sides of an end tube of the first group of tubes diverge from the flat sides of an end tube of the second group to define a pie shaped gap between the first and second groups as viewed in cross section.

A bend relief spacer is disposed in the pie shaped gap and extends between the upper and lower headers. The bend relief spacer has a first leg engaging the flat side of the end tube of the first group and a second leg engaging the flat side of the end tube of the second group. The legs of the bend relief spacer diverge from one another and at least one cross member interconnects the legs. The heat exchanger assembly may more than one bend relief spacer.

As viewed in cross section, the legs have front and rear edges and feet that extend along the edges to cradle the end tubes. The feet hold the bend relief spacer in the pie shaped gap between the end tubes of the first and second groups for brazing.

Figure 1:
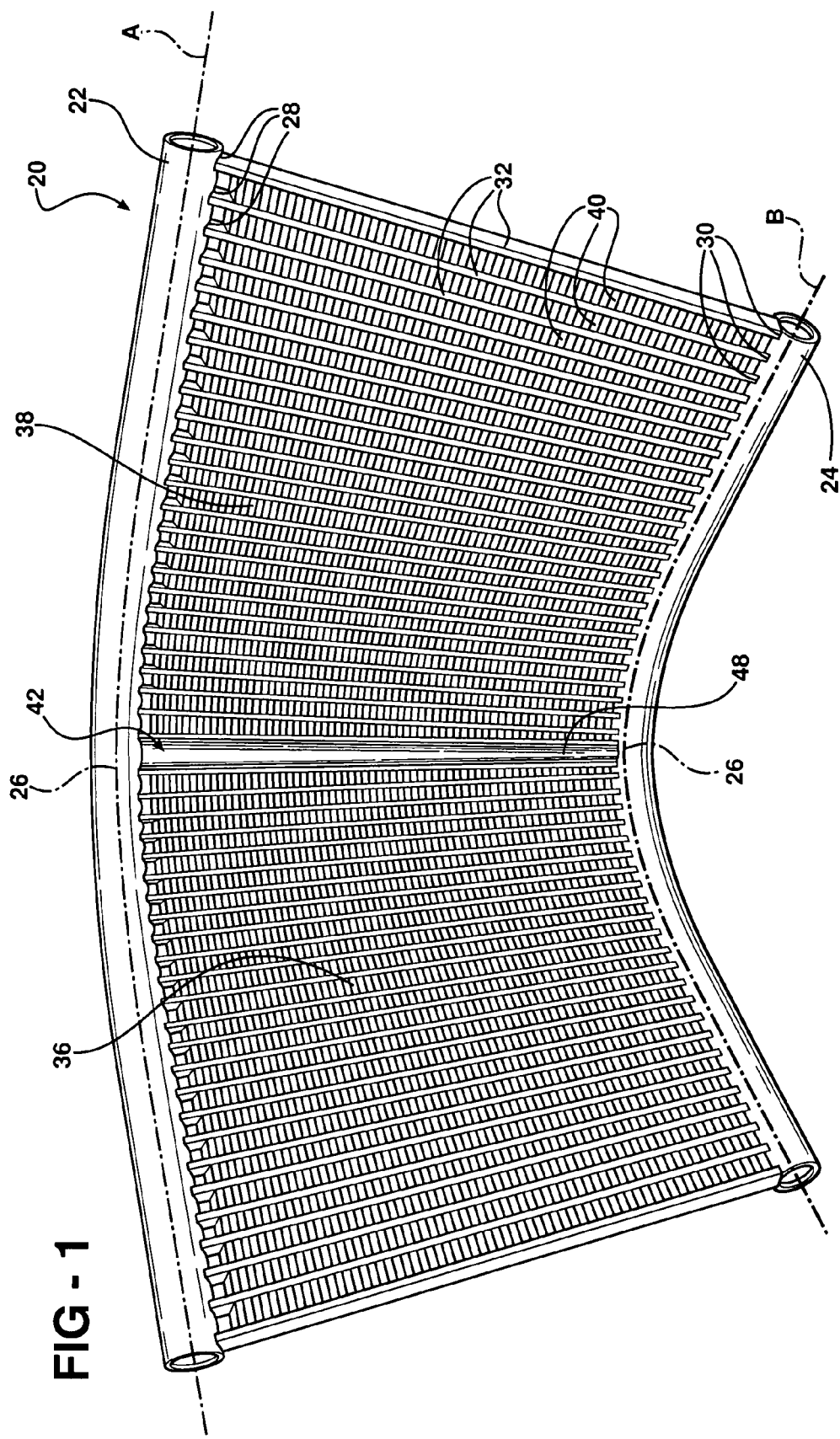
FIG. 1 is a perspective view of the subject invention.
Figure 2:
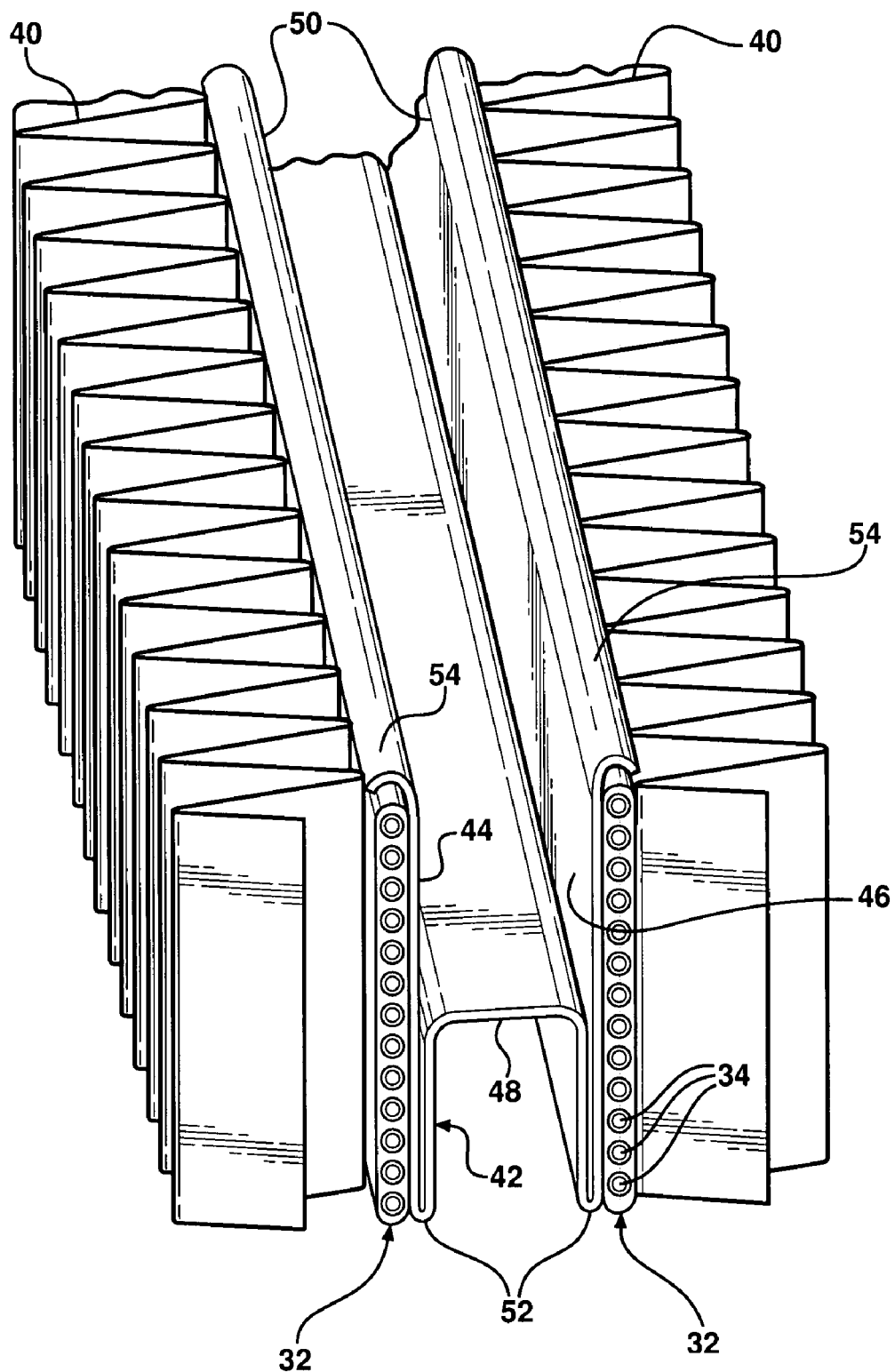
FIG. 2 is a fragmentary perspective view of the bend relief spacer of the subject invention between adjacent groups of tubes and air fins.

The bend relief spacer shown in FIG. 2 has a cross member which, when viewed in cross section, is U-shaped and has arms integrally connected to and extending from the rear edges toward the front edges to an intermediate position therebetween. The cross member also includes a base disposed at the intermediate position that extends between the arms.

Figure 3:
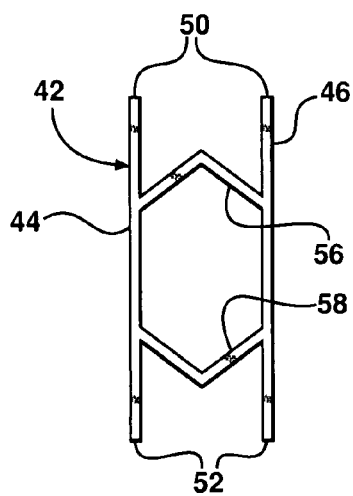
FIG. 3 is an end view of a second embodiment of the bend relief spacer.

In the embodiment shown in FIG. 3, the cross member, when viewed in cross section, includes a front strut member being V-shaped and having struts extending away from the front edges in opposite directions from an apex. Each strut extends from the apex to the opposing legs of the bend relief spacer. The cross member also includes a rear strut member being spaced between the front strut member and the rear edges. Like the front strut member, the rear strut member is V-shaped and has struts extending away from said rear edges in opposite directions from an apex. Each strut extends from the apex to the opposing legs of the bend relief spacer.

Figure 4:
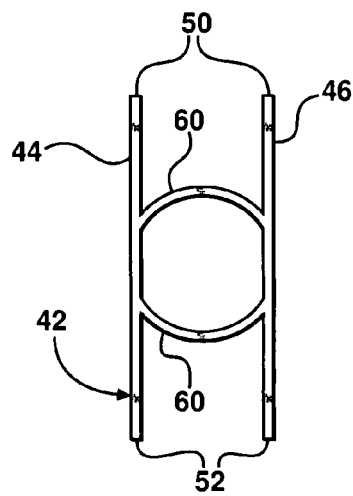
FIG. 4 is an end view of a third embodiment of the bend relief spacer.

In the embodiment shown in FIG. 4, the cross member, when viewed in cross section, includes a front arc member being arc-shaped and arcing toward the front edges of the bend relief spacer from the first leg to the second leg. The cross member also includes a rear arc member being arc-shaped and arcing toward the rear edges of the bend relief spacer.

Figure 5:
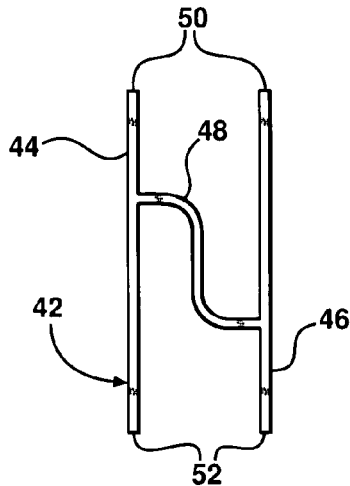
FIG. 5 is an end view of a fourth embodiment of the bend relief spacer.

In the embodiment shown in FIG. 5, the cross member, when viewed in cross section, extends in an S-shape between the legs of the bend relief spacer.

Figure 6:
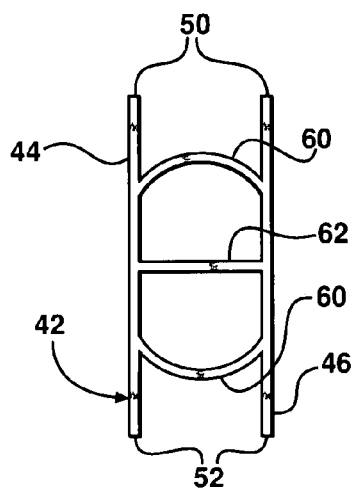
FIG. 6 is an end view of a fifth embodiment of the bend relief spacer.

In the embodiment shown in FIG. 6, the cross member, when viewed in cross section, includes a beam disposed halfway between the front and rear edges and extending between the first and second legs. A front arc member being arc-shaped is disposed halfway between the front edges and the beam and arcs toward the front edges from the first leg to the second leg. A rear arc member being arc-shaped is disposed halfway between the rear edges and the beam and arcs toward the rear edges from the first leg to the second leg.

Figure 7:
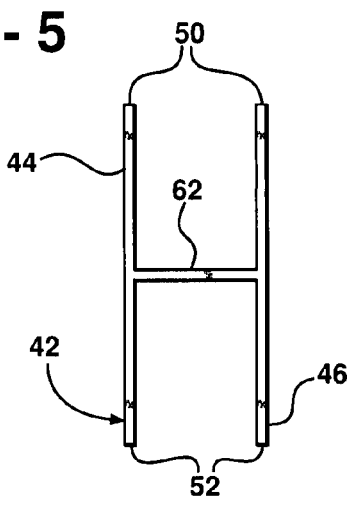
FIG. 7 is an end view of a sixth embodiment of the bend relief spacer.

In the embodiment shown in FIG. 7, the cross member, when viewed in cross section, is a beam disposed halfway between the front and rear edges and extending between the first and second legs of the bend relief spacer.

Accordingly, the invention also includes a method of fabricating a heat exchanger assembly. The method begins by forming a plurality of upper apertures having a cross section defined by flat sides interconnected by round ends in an upper header to define a plurality of upper tube slots. The method continues with forming a plurality of lower apertures in a lower header having the same spacing and cross section as the upper apertures to define a plurality of lower tube slots corresponding with the upper tube slots.

The method continues by forming a plurality of tubes having upper and lower ends and having a tube cross section defined by flat sides interconnected by rounded ends. The tubes and headers are interconnected by inserting the upper ends of the tubes into the upper tube slots and inserting the lower ends of the tubes into the corresponding lower tube slots and to define a plurality of air gaps between the flat sides of the tubes. The method continues by inserting an air fin in each of the air gaps between tubes in first and second groups of tubes to engage the flat sides of adjacent tubes and extending between the headers.

The method proceeds by inserting a bend relief spacer having first and second legs and at least one cross member, and engaging the first and second legs of the bend relief spacer with the flat sides of the adjacent end tubes of the first and second groups. The tubes, air fins, and bend relief spacer are made into one integral heat exchanger by brazing the plurality of tubes to the upper and lower headers and brazing the air fins and bend relief spacers to the flat sides of the tubes. The method is finished by bending the upper and lower headers to define at least one bend separating the first group of tubes from the second group of tubes, and moving the legs of the bend relief spacer angularly with respect to each other about a pivot point defined by the cross member to maintain the legs in engagement with the flat sides of the end tubes of the first and second groups.

While the invention has been described with reference to an exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A heat exchanger assembly comprising;
an upper header extending along an upper centerline,
a lower header extending along a lower centerline,
said headers being spaced from one another with said centerlines thereof being parallel and extending through parallel bends,
said upper header defining a plurality of upper tube slots being spaced along said upper centerline,
said lower header defining a plurality of lower tube slots being spaced along said lower centerline and aligned with said upper tube slots,
a plurality of tubes extending between said upper and lower tube slots and disposed in first and second groups,
an air fin disposed between and engaging adjacent tubes in each of said groups and extending between said upper and lower headers,
a bend relief spacer disposed between the end tubes of adjacent groups and having a first leg engaging the end tube of said first group and a second leg engaging the end tube of said second group and at least one cross member interconnecting said legs,
wherein said legs of said bend relief spacer include front and rear edges as viewed in cross section,
wherein said tubes have a cross section defining spaced flat sides and rounded ends, and
feet extending along and from said edges of said legs to cradle the rounded ends of said end tubes for brazing.

2. A heat exchanger assembly comprising;
an upper header of aluminum and extending along an upper centerline,
a lower header of aluminum and extending along a lower centerline,
said headers being spaced from one another with said centerlines thereof being parallel and extending through parallel bends,
said upper header defining a plurality of upper tube slots being spaced along said upper centerline,
said lower header defining a plurality of lower tube slots being spaced along said lower centerline and aligned with said upper tube slots,
a plurality of tubes being of aluminum and having a cross section defining spaced flat sides and round ends and extending between said aligned upper and lower tube slots,
each of said tubes defining a plurality of fluid passages each being generally round in cross section for establishing fluid communication between said upper header and said lower header,
said flat sides of adjacent tubes being spaced from one another to define a plurality of air passages for the flow of air between said adjacent tubes,
said tubes being disposed in a plurality of groups with said tubes in each group having said flat sides disposed in parallel relationship to one another, an air fin disposed between and brazed to said parallel flat surfaces of said tubes and extending between said lower and upper headers and being corrugated for dissipating heat from said tubes, a first of said groups disposed along said centerlines on one side of said bends and a second of said groups disposed along said centerlines on the other side of said bends so that said flat sides of an end tube of said first group of tubes diverge from said flat sides of an end tube of said second group of tubes to define pie shaped gaps between said first and second groups as viewed in cross section, and a bend relief spacer disposed in each pie shaped gap having a first leg engaging said flat side of said end tube of said first group and a second leg engaging said flat side of said end tube of said second group so that said legs diverge from one another and at least one cross member interconnecting said legs, said bend relief spacer extending from said lower header to said upper header, said legs having front and rear edges as viewed in cross section, said legs including feet extending along and from said edges to cradle said end tubes for holding said bend relief spacer in said gap for brazing.

3. An assembly as set forth in claim 2 wherein said cross section of said cross member includes at least one beam being straight.

4. An assembly as set forth in claim 3 wherein said cross member is a beam extending between said first and second legs and being disposed halfway between said front and rear edges.

* * * * *